United States Patent Office 3,113,085
Patented Dec. 3, 1963

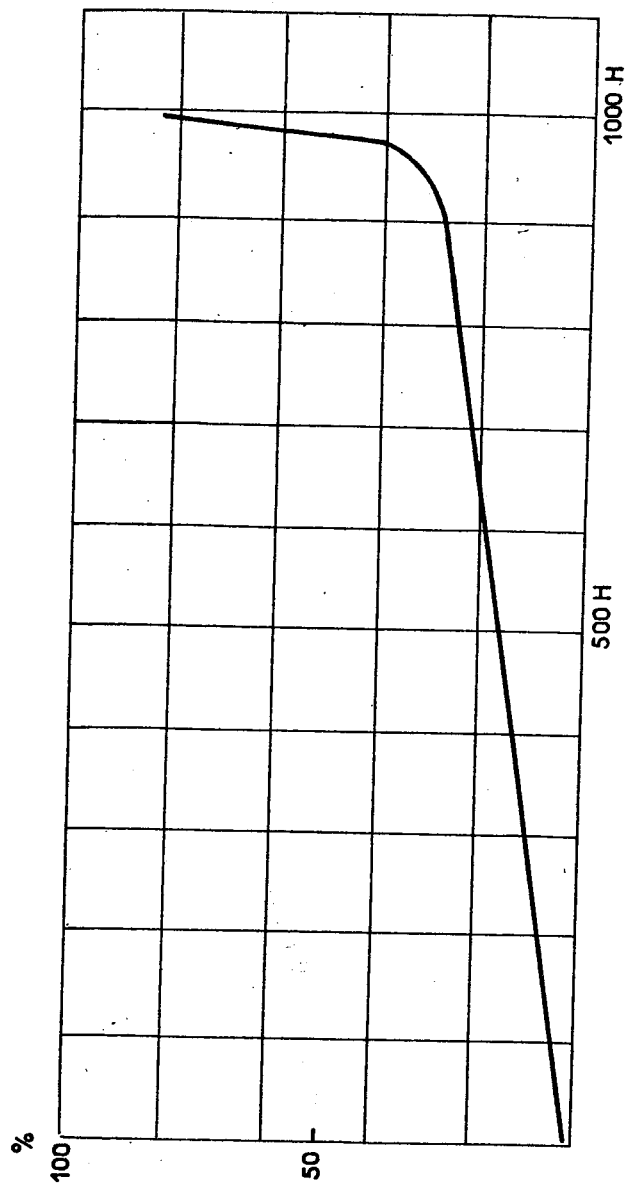

3,113,085
METHOD OF SYNTHESIS OF HYDROPEROXIDES
Bernard Auguste Gustave Besancon, Le Havre, and Marie-Lucienne Durup, born Le Judec, Chatenay Malabry, France, assignors to Societe Anonyme dite: Compagnie Francaise de Raffinage, Paris, France, a corporation of France
Filed Sept. 10, 1959, Ser. No. 839,172
5 Claims. (Cl. 204—162)

It is known to obtain hydroperoxides by the direct oxidation of hydrocarbons, such as cumene, isobutane, etc. In current practice, this operation is effected by the treatment of liquid hydrocarbons with oxygen or air at relatively high temperatures, of the order of 100° to 120° C. It is also known that under these conditions, the reaction is not entirely pure but is accompanied by secondary reactions which give rise to non-negligible quantities of by-products.

On the other hand, recent researches have shown that the oxidation reaction by oxygen or gases containing oxygen could be effected under irradiation of the hydrocarbon to be treated by high energy ionizing radiation such as $\beta$- and $\gamma$-, or X-radiation, or accelerated electrons. It has in fact been observed that the chain reaction of oxidation of the hydrocarbons considered, with the formation of hydroperoxides, may be initiated by such high energy ionizing radiation, and can thus be carried out at low or moderately-high temperatures, at which, in the absence of radiations, the reaction would only take place at infinitely small speeds.

Thus, if the speed of formation of cumene hydroperoxide is compared by measuring the quantity formed as a function of time when a treatment with air at 75° C. is applied to a sample A of cumene protected from all radiation, and a sample B of the same cumene subjected to the action of the $\gamma$ radiation from a source of cobalt 60 having an intensity of 100 rad./min., there are obtained the values which are given in Table 1 below:

Table I

[Concentration of cumene-hydroperoxide (in mols. per litre)]

| | Sample A | Sample B |
|---|---|---|
| Radiation intensity | Nil | |
| Intensity, rad./min. $\gamma$ | 0 | 100 |
| Temperature, ° C | 75 | 75 |
| Duration (hours): | | |
| 0 | 0.040 | 0.040 |
| 50 | | 0.080 |
| 73 | 0.040 | |
| 100 | | 0.155 |
| 200 | | 0.260 |
| 216 | 0.045 | |
| 311 | 0.080 | |

The researches which have formed the basis of the present invention have led to the discovery that, if a hydrocarbon of the type considered is irradiated while at the same time it is subjected to the action of oxygen or air, the speed of oxidation, measured by the formation of hydroperoxide, is at first constant and then increases vary rapidly as soon as the concentration of hydroperoxide in the medium exceeds a certain value.

This is shown by the figures of Table II below, in which are given the concentrations of hydroperoxide (column 2), measured as a function of the duration (column 1), in a sample of cumene subjected to the action of oxygen at a temperature of 50° C., under a $\gamma$ radiation of 50 rad./min., together with the coefficient of transformation of the cumene (column 3).

Table II

| 1 | 2 | 3 |
|---|---|---|
| Duration of irradiation | Concentration in cumene hydroperoxide, mol/lit. | Coefficient of transformation of the cumene, percent |
| 0 | 0.04 | 0 |
| 100 | 0.18 | 2.6 |
| 130 | 0.25 | 3.6 |
| 150 | 0.29 | 4.1 |
| 210 | 0.45 | 6.45 |
| 350 | 0.75 | 10.8 |
| 500 | 1.105 | 15.7 |
| 600 | 1.340 | 19.1 |
| 670 | 1.500 | 21.4 |
| 875 | 2.020 | 28.8 |
| 900 | 2.100 | 30.0 |
| 980 | 2.980 | 42.4 |
| 1,000 | 5.800 | 82.5 |

The accompanying diagram shows, from these results, the percentage transformation of the cumene to hydroperoxide as a function of the time in hours, during the course of a $\gamma$ irradiation of 50 rad./min. at 50° C., under the action of oxygen.

In accordance with the invention, the synthesis of the hydroperoxides is obtained without the delay and waste of the initial unproductive period by subjecting hydrocarbons such as cumene to the simultaneous action of oxygen, or gas containing oxygen, and a radio chemical radiation, the hydrocarbons containing, in solution, throughout the reaction, a quantity of hydroperoxide greater than a critical value, of the order of about 2 mols. per litre. This method enables a speed of oxidation reaction to be obtained which complies with the requirements of industry.

By way of example, the speeds of reaction expressed in mols, and in grams of oxidised cumene per hour, when the latter is treated with oxygen at 50° C. under the action of $\gamma$ radiations of an intensity of 50 rad./min. as a function of the quantities present of hydroperoxide, are given in Table III below:

Table III

| Concentration in hydroperoxide, mols/litre | Speed of oxidation of the cumene Hydroperoxide formed per litre of cumene ($\gamma$ radiation 50 rad./min) | |
|---|---|---|
| | Mols/hr. | Grams/hr. |
| 0.25 | 0.0025 | 0.38 |
| 1.30 | 0.0025 | 0.38 |
| 2.1 | 0.004 | 0.61 |
| 3.0 | 0.145 | 22.00 |

The method which characterises the invention offers in addition the remarkable advantage that it enables the hydrocarbon treated to be enriched in peroxide up to very high concentrations, in excess of 80% for example, and this without the formation of by-products resulting either from stray oxidations of the hydrocarbon or from decomposition of the hydroperoxide formed.

A further particular feature of the method according to the invention consists in carrying out the operation at a temperature less than 70° C. In fact, the formation of hydroperoxide is observed at 75°., but as soon as its concentration exceeds about 0.7 mol. per litre in the reaction medium, a rapid destruction is observed accompanied by the formation of phenol, acetone and strongly coloured gums.

Table IV illustrates this feature. It shows the concentration of cumene hydroperoxide, observed as a function of time, in a sample of cumene subjected at 75° C. to the action of oxygen and also at the same time to irradiation by a source of cobalt 60 having an intensity of 50 rad./min.

Finally, it is to be observed that the temperatures of 70° C. and below, employed in accordance with the invention, are substantially less than those of 100° to 120° C. at which the oxidation is effected in the known methods referred to at the beginning of the present description.

*Table IV*

| Duration of irradiation in hours | Concentration in cumene hydroperoxide in mols/litre |
| --- | --- |
| 0 | 0.02 |
| 200 | 0.18 |
| 300 | 0.30 |
| 400 | 0.55 |
| 480 | 0.72 |
| 580 | 0.78 |
| 610 | 0.70 |
| 650 | 0.67 |
| 700 | 0.55 |
| 750 | 0.30 |
| 850 | 0.03 |

We claim:

1. A method of manufacture of an hydroperoxide by oxidation of the corresponding hydrocarbon which comprises distributing in a hydrocarbon having a tertiary carbon atom a substantial quantity of about 2 mols per liter of the hydroperoxide which is to be produced, subjecting the resulting composition to the action of oxygen at a temperature below 70° C. and at the same time subjecting the composition with the oxygen to high energy ionizing radiation within the range of about 10–400 rad./min., and maintaining a substantial amount of said hydroperoxide in the composition throughout said radiation to effect catalysis of the formation of hydroperoxide.

2. A method of manufacture of cumene hydroperoxide by oxidation of cumene which comprises dissolving in the cumene at least two mols per litre of cumene hydroperoxide, thereafter subjecting the solution at a temperature below 70° C. to the action of oxygen and between 10 and 400 rad./min. of high energy ionizing radiation and maintaining throughout a substantial reaction period a concentration of hydroperoxide in excess of two mols per liter.

3. In a method for the manufacture of hydroperoxide by direct oxidation of a hydrocarbon having a tertiary carbon atom wherein the rate of reaction of said oxidation increases substantially after the concentration of hydroperoxide reaches about 2 mols per liter, the steps of accelerating said oxidation reaction which comprise admixing with said hydrocarbon a substantial quantity of the hydroperoxide to be produced for initially approaching said hydroperoxide concentration, reacting said admixture with oxygen for said oxidation of said hydrocarbon, concurrently subjecting said admixture during said oxidation to high energy ionizing radiation within the range of about 10–400 rad./min., and maintaining the temperature during said oxidation at less than about 70° C. for avoiding formation of undesired byproducts and decomposition products of said oxidation reaction and said hydroperoxide formed thereby.

4. In a method for the manufacture of hydroperoxide by direct oxidation of a hydrocarbon having a tertiary carbon atom wherein the rate of reaction of said oxidation increases substantially after the concentration of hydroperoxide reaches a value of about 2 mols per liter, the steps of accelerating said oxidation reaction which comprise admixing with said hydrocarbon a substantial quantity of the hydroperoxide to be produced for initially approaching said hydroperoxide concentration, reacting said admixture with oxygen for said oxidation of said hydrocarbon, concurrently subjecting said admixture during said oxidation to high energy ionizing radiation within the range of about 10–400 rad./min., and maintaining the temperature during said oxidation less than the temperature at which are formed undesired decomposition products and byproducts of said oxidation reaction and said hydroperoxide.

5. A method as recited in claim 4 in which said hydrocarbon to be oxidized is cumene.

References Cited in the file of this patent

Durup et al.: "Proceedings of the Second United Nations International Conference on the Peaceful Uses of Atomic Energy," volume 29, pages 143–151, September 1–13, 1958.